US012033793B2

(12) United States Patent
Omiya et al.

(10) Patent No.: US 12,033,793 B2
(45) Date of Patent: Jul. 9, 2024

(54) METHOD OF MANUFACTURING MAGNETIC MEMBER AND THE MAGNETIC MEMBER

(71) Applicant: TOKIN CORPORATION, Sendai (JP)

(72) Inventors: Tadashi Omiya, Tokyo (JP); Masakazu Abe, Tokyo (JP)

(73) Assignee: TOKIN CORPORATION, Miyagi (JP)

( * ) Notice: Subject to any disclaimer, the term of this patent is extended or adjusted under 35 U.S.C. 154(b) by 66 days.

(21) Appl. No.: 17/533,485

(22) Filed: Nov. 23, 2021

(65) Prior Publication Data

US 2022/0172887 A1 Jun. 2, 2022

(30) Foreign Application Priority Data

Nov. 27, 2020 (JP) ................................ 2020-197180

(51) Int. Cl.
*H01F 41/32* (2006.01)
*H01F 41/02* (2006.01)

(52) U.S. Cl.
CPC ......... *H01F 41/0246* (2013.01); *H01F 41/32* (2013.01)

(58) Field of Classification Search
None
See application file for complete search history.

(56) References Cited

U.S. PATENT DOCUMENTS 6,195,525 B1 * 2/2001 Maeyama .............. H05B 6/145 347/156
2010/0012881 A1 * 1/2010 Aramaki .................. H01F 1/26 427/130
2010/0099365 A1 * 4/2010 Aramaki ............... H01Q 1/243 428/324
2015/0342099 A1 * 11/2015 Jang ........................ H01Q 1/52 428/323
2020/0253098 A1 8/2020 Lee et al.
2020/0312365 A1 * 10/2020 Yamaga .............. G11B 5/7334

FOREIGN PATENT DOCUMENTS

JP 2004031578 A 1/2004
JP 2004071070 * 3/2004
JP 2013056968 * 3/2013
JP 2019503068 A 1/2019

* cited by examiner

*Primary Examiner* — Mandy C Louie
(74) *Attorney, Agent, or Firm* — Holtz, Holtz & Volek PC

(57) ABSTRACT

A method of manufacturing a magnetic member comprises preparing a base member, which have a front surface and a back surface, and wherein an anchor coat layer is formed on the front surface, and forming a composite magnetic layer on the anchor coat layer.

5 Claims, 3 Drawing Sheets

METHOD OF MANUFACTURING MAGNETIC MEMBER AND THE MAGNETIC MEMBER

CROSS REFERENCE TO RELATED APPLICATIONS

This application is based on and claims priority under 35 U.S.C. § 119 to Japanese Patent Application No. JP2020-197180 filed Nov. 27, 2020, the contents of which are incorporated herein in their entirety by reference.

BACKGROUND OF THE INVENTION

This invention relates to a method of manufacturing a magnetic member and to the magnetic member manufactured by the method.

JP-A-2004-031578 (Patent Document 1) discloses a first magnetic sheet (a magnetic member) in which a magnetic layer made of magnetic composite material is directly formed on a support medium. Patent Document 1 also discloses a second magnetic sheet (a magnetic member) in which a magnetic layer made of magnetic composite material is formed on a support medium via an adhesive layer.

Japanese Translation of PCT International Application Publication No. JP-T-2019-503068 (Patent Document 2) discloses a magnetic field shielding unit (a magnetic member) having a sheet-like shape. The magnetic field shielding unit is provided with a ferrite sheet and a protecting member provided on an upper portion of the ferrite sheet.

In the magnetic field shielding unit of Patent Document 2, the protecting member is provided with a base member and an adhesive layer formed on a surface of the base member. The base member is stuck to the ferrite sheet using the adhesive layer.

The sheet-like magnetic member is often bent according to a shape of an object when used. Accordingly, the magnetic layer might be unstuck from the support medium when the magnetic layer is directly formed on the support medium as with the first magnetic sheet disclosed in Patent Document 1. In other words, the magnetic sheet in which the magnetic layer is directly formed on the support medium has a problem that interlayer strength between the magnetic layer and the support medium is inclined to lack.

On the other hand, such a problem as the above-mentioned problem is difficult to be occurred in each of the second magnetic sheet of the Patent Document 1 and the magnetic field shield unit of Patent Document 2. However, the adhesive layer needs a thickness thicker than a predetermined thickness to obtain enough adhesive force. For example, the adhesive layer needs a thickness of 3 to 50 μm. Therefore, each of the second magnetic sheet of the Patent Document 1 and the magnetic field shield unit of Patent Document 2 has a problem of difficulty of reducing the thickness thereof.

SUMMARY OF THE INVENTION

It is an object of the present invention to provide a method of manufacturing a magnetic member which can manufacture the magnetic member which has a sufficient interlayer strength between a base member and a magnetic member and which has a thinner thickness, and thus to provide a magnetic member which is thin and which is difficult to be damaged when bent.

One aspect of the present invention provides a method of manufacturing a magnetic member. The method comprises preparing a base member having a front surface and a back surface, wherein an anchor coat layer is formed on the front surface; and forming, on the anchor coat layer, a composite magnetic layer in which magnetic powder is dispersed in a binder.

Another aspect of the present invention provides a magnetic member. The magnetic member comprises a base member, an anchor coat layer formed on the base member and a composite magnetic layer formed on the anchor coat layer. The anchor coat layer has a thickness which is at least 0.5 μm and smaller than 1 μm.

According to the method of manufacturing the magnetic member of the present invention, the base member with the anchor coat layer formed on the surface thereof is used, and the composite magnetic layer is formed on the anchor coat layer. Therefore, sufficient interlayer strength between the magnetic layer and the base member can be obtained, and the magnetic member thinner than a case where an adhesive layer is used can be manufactured. Moreover, according to the method of manufacturing the magnetic member of the present invention, the composite magnetic substance in which magnetic powder is dispersed in the binder is used as the magnetic substance, and thereby the magnetic member with high flexibility can be manufactured. Thus, according to the present invention, the magnetic member which is thin and difficult to be damaged by being bent can be provided.

An appreciation of the objectives of the present invention and a more complete understanding of its structure may be had by studying the following description of the preferred embodiment and by referring to the accompanying drawings.

Figure 1:
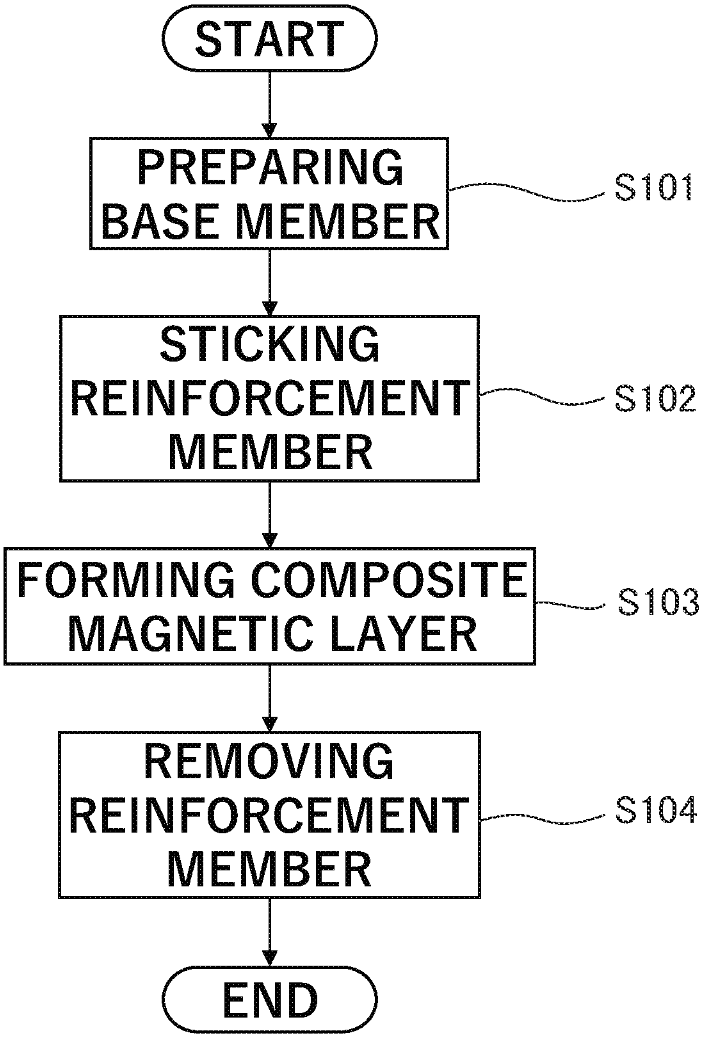
FIG. 1 is a flowchart for describing a method of manufacturing a magnetic member according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Referring to FIGS. 1 to 5, the description will be made about a method of manufacturing a magnetic member according to an embodiment of the present invention.

Figure 2:
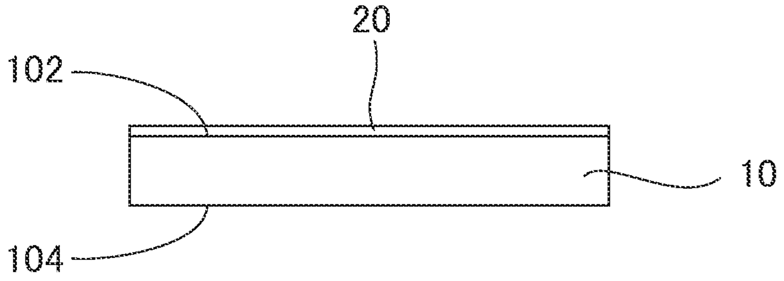
FIG. 2 is a cross-sectional view showing a base member used in the method of manufacturing the magnetic member of FIG. 1. On a front surface of the base member, an anchor coat layer is formed.

First, a base member 10 as shown in FIG. 2 is prepared (Step 101). The base member 10 has a front surface 102 and a back surface 104, and an anchor coat layer 20 is formed on the front surface 102. In other words, the base member 10 is the base member 10 with the anchor coat layer 20.

As the base member 10, a polyethylene terephthalate (PET) film can be used. Alternatively, as the base member 10, a composite film having a conductive layer formed on a back surface of a PET film can be used. In that case, the conductive layer is stuck on the back surface of the PET film using an adhesive. The conductive layer is an aluminum foil or a copper foil, for example.

In the present embodiment, a size of the base member 10 may be remarkably larger than that of a real product. For example, the base member 10 may be a long and wide film. It is preferable that a thickness of the base member 10 is as thin as possible. A thickness of the PET film may be 5 μm to 20 μm, for example, and an example thereof is about 12 μm. Moreover, a thickness of the conductive layer may be 1 μm to 15 μm, for example, and an example thereof is about 7 μm.

In the present embodiment, the anchor coat layer 20 is made of polyether-based resin or polyester-based resin, for example. Material of the anchor coat layer 20 may be selected according to an expected usage environment of the magnetic member. For example, when magnetic material is required to have solvent resistance and mechanical strength, it is preferable to use polyester-based resin as the material of the anchor coat layer 20. Moreover, when the magnetic material is required to have water resistance such as when the magnetic member is used under high humidity, it is preferable to use polyether-based resin as the material of the anchor coat layer 20.

It is preferable that a thickness of the anchor coat layer 20 is as thin as possible. For example, it is preferable that the thickness of the anchor coat layer 20 is smaller than 1 μm. However, the anchor coat layer 20 needs some thickness to excellently form a composite magnetic layer (see FIG. 4) mentioned later. For example, it is preferable that the thickness of the anchor coat layer 20 is equal to 0.5 μm or more.

Figure 3:
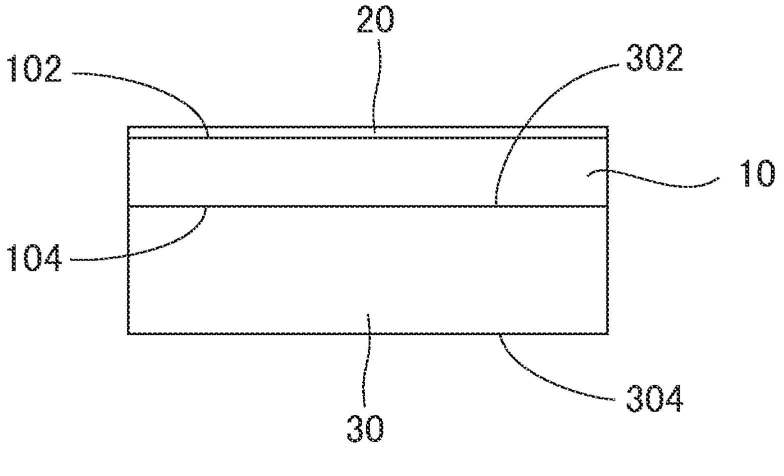
FIG. 3 is a cross-sectional view showing a state that a reinforcement member is stuck on a back surface of the base member of FIG. 2.

Next, as shown in FIG. 3, a reinforcement member 30 is stuck on the back surface 104 of the base member 10 (Step S102). In detail, the reinforcement member 30 has a front surface 302 and a back surface 304. In the present embodiment, a mold release agent is applied to the back surface 304 of the reinforcement member 30, and the front surface 302 of the reinforcement member 30 is stuck on the base member 10. In detail, the reinforcement member 30 is stuck on the back surface 104 of the base member 10 using adhesive (not shown) applied to the front surface 302 or using an adhesive tape (not shown) stuck on the front surface 302. By using an appropriate something as the adhesive or the adhesive tape, the front surface 302 of the reinforcement member 30 is given with slight adhesiveness for the back surface 104 of the base member 10. Accordingly, the reinforcement member 30 is detachable from the base member 10. In particular, when the base member 10 with a thin thickness is used, it might be hard to handle the base member 10 singly. Therefore, it is preferable to use the reinforcement member 30 to facilitate handling of the base member 10.

The reinforcement member 30 is a PET film, for example. It is not always necessary to apply the mold release agent to the back surface 304 of the reinforcement member 30. However, it is desirable that the mold release agent is applied to the back surface 304 of the reinforcement member 30 in consideration of storing a half-finished product after formation of a composite magnetic layer 40. For example, if the base member 10 is a long film, the mold release agent can prevent the composite magnetic layer 40 from adhering to the reinforcement member 30 when the half-finished product after the formation of the composite magnetic layer 40 is wound in a roll shape to be stored.

As described later, the reinforcement member 30 is removed in a later process. In other words, the reinforcement member 30 is not a component of the magnetic member manufactured by the method according to the present embodiment. Accordingly, the thickness of the reinforcement member 30 is not limited particularly. However, it is preferable that the thickness of the reinforcement member 30 is as thin as possible. When the base member 10 has necessary and sufficient strength, the step S102 may be omitted not to provide the reinforcement member 30.

Figure 4:
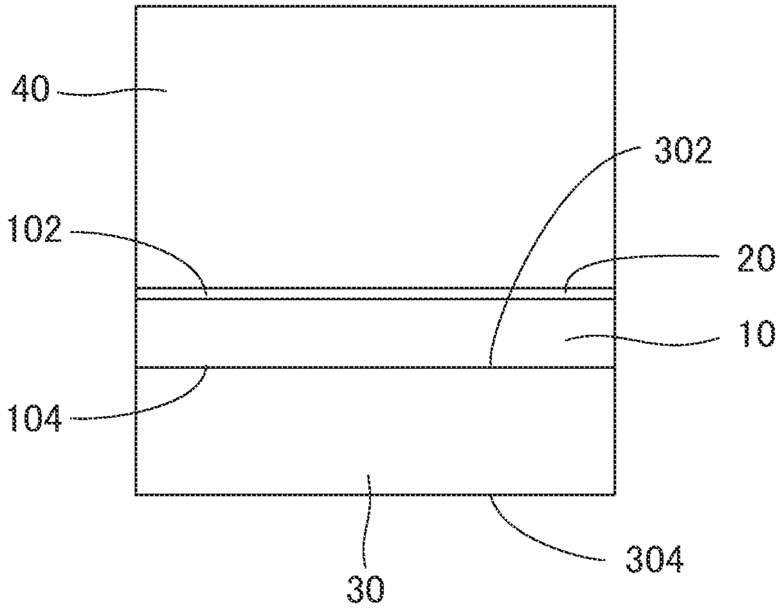
FIG. 4 is a cross-sectional view showing a state that a composite magnetic layer is formed on the anchor coat layer of FIG. 3.

Next, as shown in FIG. 4, the composite magnetic layer 40 is directly formed on the anchor coat layer 20 (step S103). The composite magnetic layer 40 is formed by applying coating liquid in which magnetic powder is dispersed in a binder and drying the coating liquid. In detail, the coating liquid formed by mixing soft magnetic powder, binding agent, organic solvent, fire retardant and others is applied onto the anchor coat layer 20 and dried. The applying of the coating liquid is carried out so that the composite magnetic layer 40 has a thickness of 100 μm or less after the coating liquid is dried.

Here, as the soft magnetic powder, magnetic stainless steel (Fe—Cr—Al—Si based alloy), Fe—Si—Al based alloy such as Sendust (a registered trademark), permalloy (Fe—Ni based alloy), silicon copper (Fe—Cu—Si based alloy), Fe—Si based alloy, Fe—Si—B(—Cu—Nb) based alloy, Fe—Ni—Cr—Si based alloy, Fe—Si—Cr based alloy, Fe—Si—Al—Ni—Cr based alloy, Mo—Ni—Fe based alloy, amorphous alloy or the like is preferable. These various types of soft magnetic powders may be selectively used alone or in combination of two or more. In particular, in order to improve magnetic permeability characteristic, a metal alloy having large magnetization is desirable. Moreover, a shape of a particle in the soft magnetic powder is not particularly limited, but it is preferable to be a flat particle. In addition, it is desirable that, in the composite magnetic layer 40, almost all particles each of which has a flat shape are arranged to be directed in the same direction and to be generally parallel to a main surface of the composite magnetic layer 40.

Moreover, as the binding agent, a polymeric binder, such as rubber, elastomer, resin or the like, is preferable, and thermoplastic resin is more preferable. In particular, ethylene-vinyl acetate copolymerization resin (EVA), acrylonitrile—butadiene rubber (NBR), nitrile rubber, ethylene propylene diene rubber, acrylic rubber, ethylene-vinyl acetate copolymer, silicone rubber, polyurethane or the like is preferable.

Figure 5:
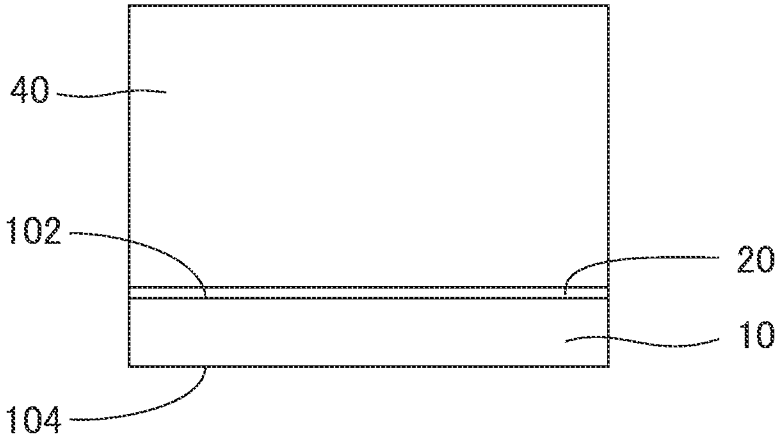
FIG. 5 is a cross-sectional view showing a magnetic member manufactured by the method of manufacturing the magnetic member of FIG. 1.

Next, as shown in FIG. 5, the reinforcement member 30 is unstuck (step S104). It should be noted that this process is unnecessary when the step S201 is omitted.

As described above, the magnetic member is manufactured by the method of manufacturing the magnetic member according to the present embodiment. When the base member 10 is the long and wide film, the magnetic member manufactured is cut in accordance with a product size. For example, the magnetic member manufactured may be cut into a plurality of long products each of which has a narrow width.

As mentioned above, according to the present embodiment, the composite magnetic layer 40 is directly formed on the anchor coat layer 20 of the base member 10. With this structure, sufficient interlayer strength can be obtained between the base member 10 and the composite magnetic layer 40, and the thickness of the magnetic member can be reduced. As a result, the composite magnetic layer 40 is not unstuck even if the magnetic member is bent, so that the magnetic member which is difficult to be damaged is obtained.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A method of manufacturing a magnetic member, the method comprising:

preparing a base member having a front surface and a back surface, wherein an anchor coat layer is formed on the front surface;

applying, to the anchor coat layer, coating liquid in which magnetic powder is dispersed in a binder and drying the coating liquid;

sticking a reinforcement member on the back surface of the base member before the applying of the coating liquid to the anchor coat layer; and unsticking the reinforcement member after the drying of the coating liquid.

2. The method as recited in claim 1, wherein:

the reinforcement member has a front surface and a back surface;

the front surface of the reinforcement member is stuck to the base member; and on the back surface of the reinforcement member, a release agent is applied.

3. The method as recited in claim 1, wherein the anchor coat layer has a thickness which is at least 0.5 μm and smaller than 1 μm.

4. The method as recited in claim 1, wherein the anchor coat layer is made of polyether-based resin or polyester-based resin.

5. The method as recited in claim 1, wherein the base member comprises a composite film having a conductive layer formed on a back surface of a polyethylene terephthalate (PET) film.

* * * * *